Aug. 15, 1967

N. ZWIEBEL 3,335,927

STACKING APPARATUS

Filed Aug. 31, 1965

INVENTOR
NORMAN ZWIEBEL
BY
Roberts + Cohen
ATTORNEYS

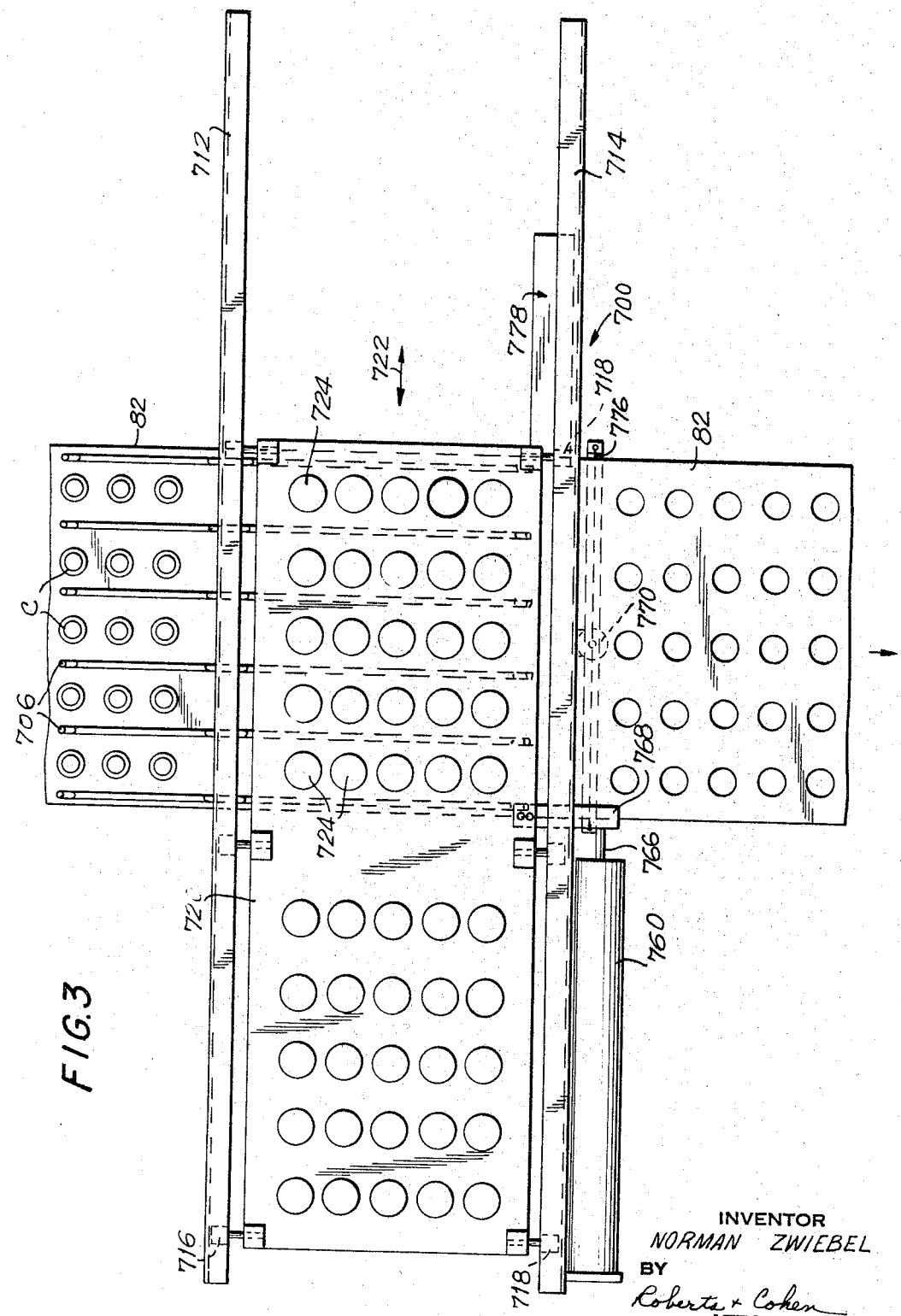

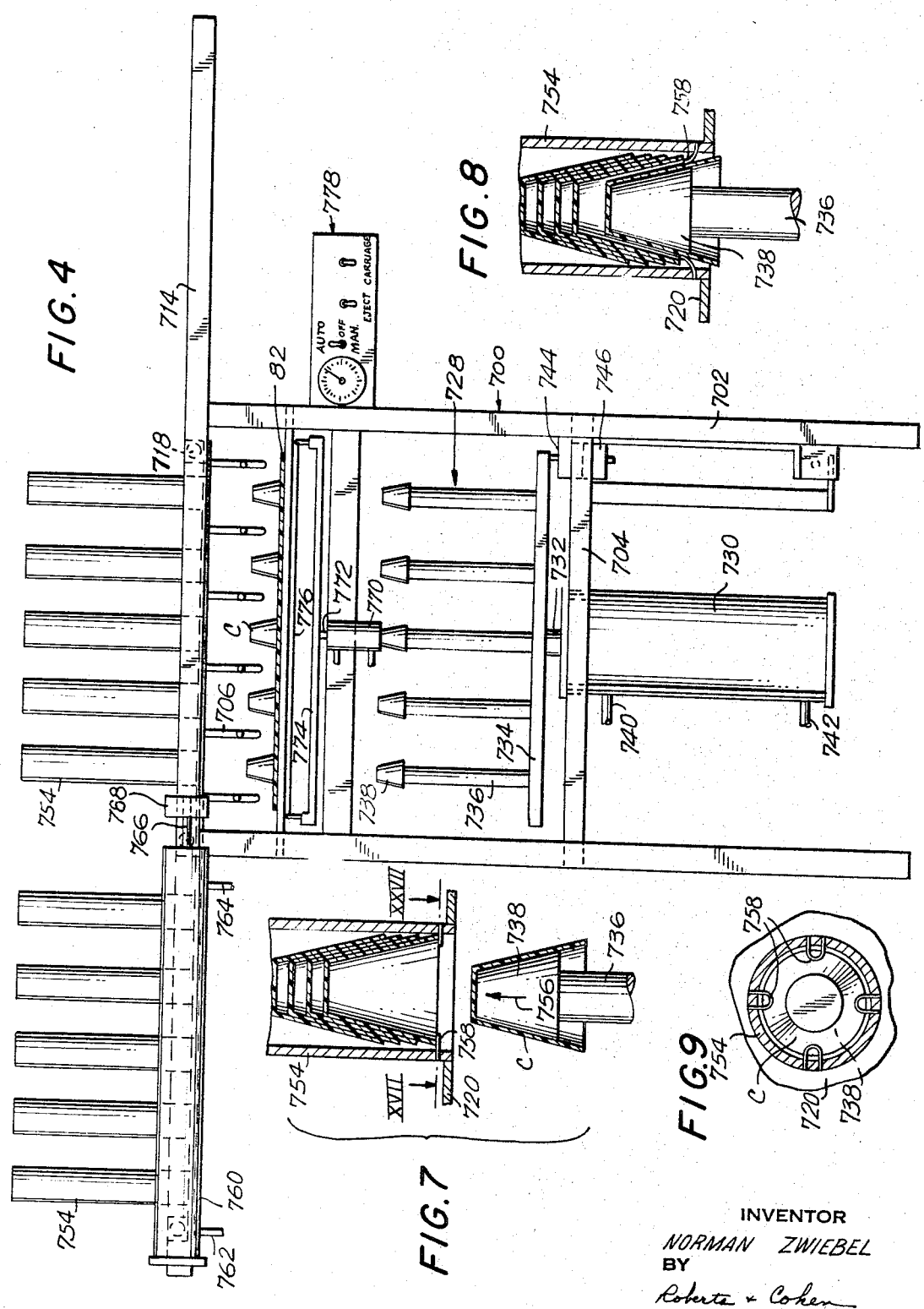

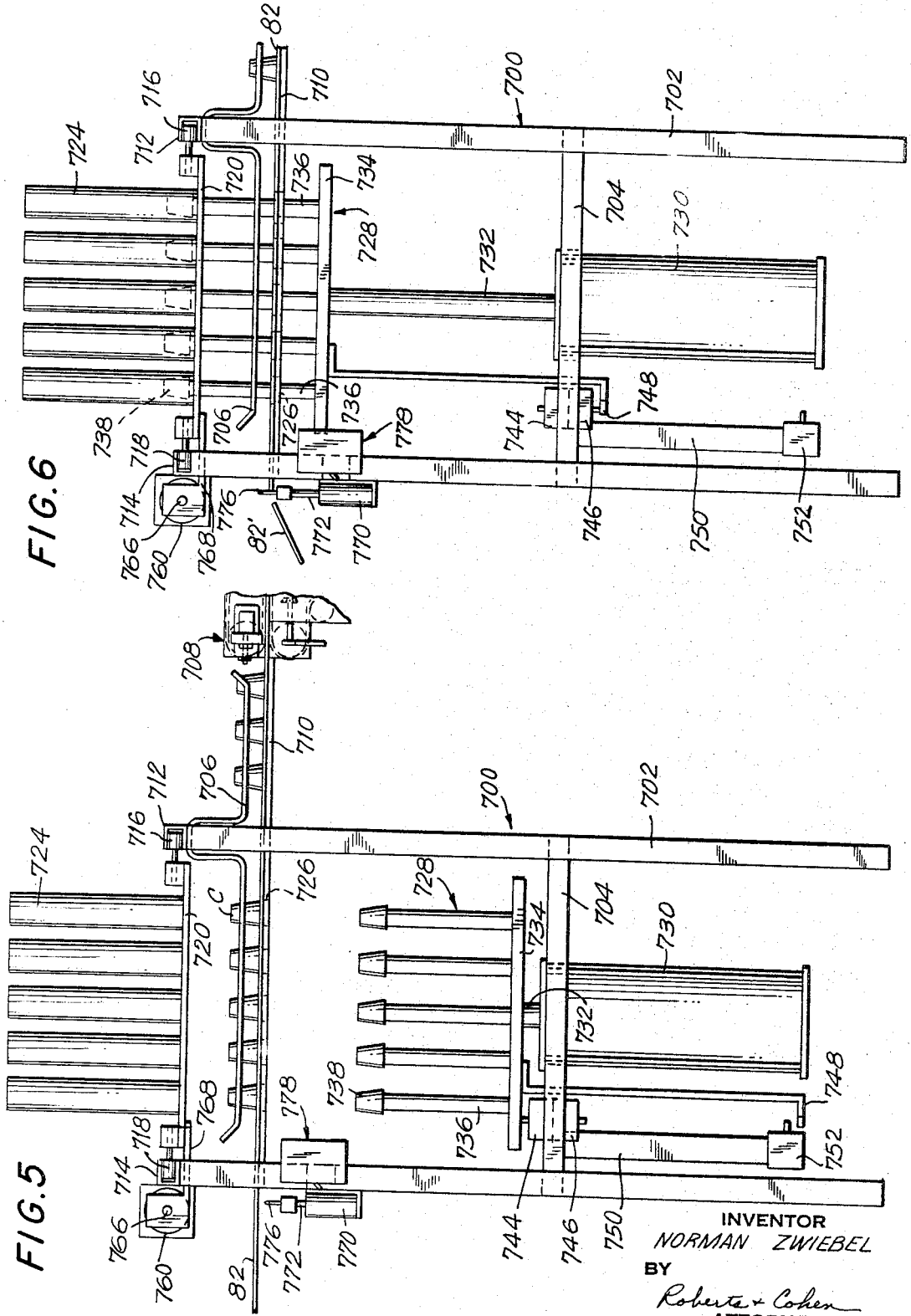

United States Patent Office 3,335,927
Patented Aug. 15, 1967

3,335,927
STACKING APPARATUS
Norman Zwiebel, Bayside, N.Y.
(20—16 130th St., College Point, N.Y. 11356)
Filed Aug. 31, 1965, Ser. No. 484,048
12 Claims. (Cl. 225—97)

This invention relates generally to sheet processing apparatus and techniques and more particularly to means for separating formed articles from a processed sheet and means for automatically stacking the thusly separated articles.

Apparatus and techniques are known for forming thermoplastic sheet materials, for example, into three-dimensional shapes by the use of various forming means.

Among the objects of the invention is the provision of means for separating the thusly formed articles from the sheet in which they have been formed whether the articles were formed above or below the sheet plane or both.

Another object of the invention is to provide an improved apparatus for automatically removing formed articles from their base sheet and for stacking the thusly removed articles as a part of a packing procedure.

In achieving the above and other of its objectives, the invention provides, for example, apparatus for removing from a sheet three-dimensional articles which open downwardly and are arranged in the sheet in some predetermined way. Said apparatus, as will be shown, comprises according to one preferred arrangement a plurality of towers which are superposed above the articles and mandrels or rods positioned below the towers and adapted to thrust the three-dimentional articles into the tower. The aforesaid towers, as will hereafter appear, can be arranged in two or more groups selectively positionable to receive said articles while the idle groups are being evacuated of previously collected articles.

The above objects and features of the invention, as well as advantages thereof, will become apparent from the following detailed description of some preferred embodiments of the invention as illustrated in the accompanying drawing, in which:

FIGURE 3 is a top plan view of an up-stacking mechanism employed in accordance with a feature of the invention, the view showing the processing of a plastic sheet in which three-dimensional protrusions have been formed;

FIGURE 4 is an end view of the up-stacking mechanism of FIG. 3, there being shown in this figure a means for ejecting the three-dimensional protrusions or articles of manufacture from the plastic sheet;

FIGURE 5 is a side view of the up-stacking mechanism, there appearing in this figure the tail end of the chain conveyor system previously described;

FIGURE 6 is a side view corresponding to that of FIG. 5, showing, however, a second condition of operation;

FIGURE 7 is a sectional view through one of the up-stacking towers of FIGS. 3–6;

FIGURE 8 is a view corresponding to FIG. 7, showing a second condition of operation pertaining to the up-stacking tower; and FIGURE 9 is a sectional ivew taken through line XXVII—XXVII of FIG. 7;

Figure 1:
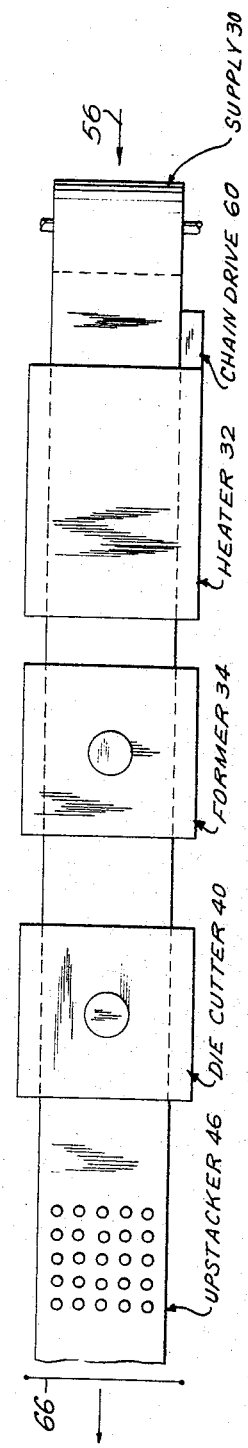
FIGURE 1 is a diagrammatic top plan view of an apparatus embodying a stacking device contemplated in accordance with the invention.
Figure 2:
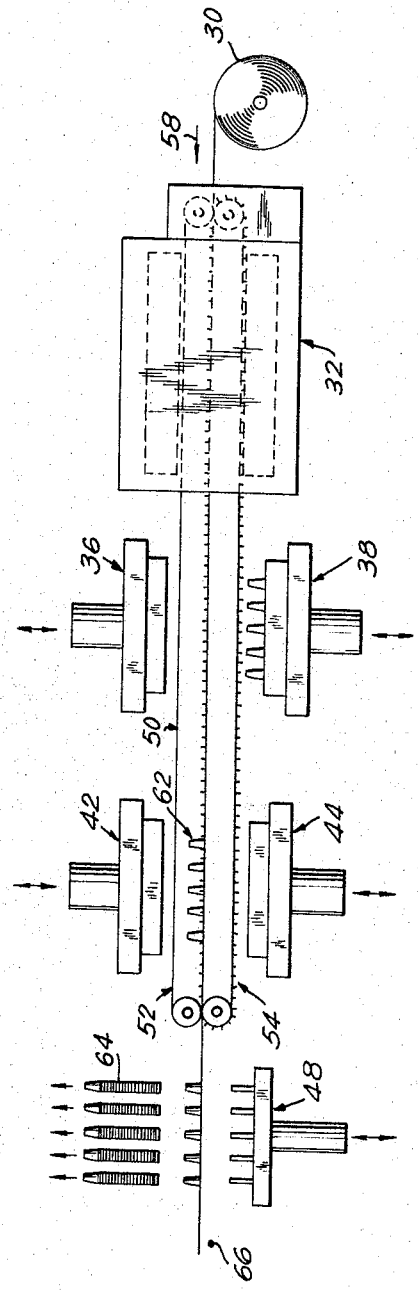
FIGURE 2 is a side view of the apparatus of FIG. 1.

Referring now to FIGS. 1 and 2, it will be seen that the illustrated apparatus comprises generally a source 30 of sheet material, a heater 32, a former 34 including an upper member 36 and a lower member 38, a die cutter 40 including an upper member 42 and a lower member 44, and an up-stacking zone 46 inclusive of a reciprocal up-stacking element 48.

Said apparatus, moreover, comprises a chain conveyor 50 which, as illustrated in FIG. 2, includes an upper endless chain 52 and a lower endless chain 54, although as will be hereinafter seen, a single chain on at least one of the opposite lateral edges of the sheet may also be employed.

The sheet generally travels in the direction indicated by arrows 56 and 58 and is engaged by the conveyor by means to be subsequently described in detail, the chain being driven by the diagrammatically indicated chain drive 60, the details of which will also appear hereinafter.

The sheets travels sequentially from the heater 32 to the former 34 whereat three-dimensional protrusions are formed in the sheet on either or both sides of the plane of the sheet, such three-dimensional protrusions appearing in FIG. 2 as indicated at 62.

In the die cutter 40, the three-dimensional protrusions, which constitute the formed articles produced in the apparatus of the invention, are partially severed from the sheet by operation of platens 42 and 44, the sheet thence travelling to the up-stacker 46 whereat through the operation of up-stacker element 48 the articles are displaced upwardly into stacks 64.

In order to sever the remaining waste material from the oncoming sheet subsequently moving to terminal processing, there is provided a thermally effective wire cut-off 66.

As has been stated hereinbefore, the invention contemplates the provision of a new and improved mechanism for collecting the plastic articles of manufacture which have been formed, such mechanism being constituted by the up-stacking device illustrated in FIGS. 3–9.

In FIGS. 3–9 is illustrated a frame 700 consisting of uprights 702 and transverse frame members 704. Attached to the uprights 702 are a plurality of guide rods 706, said guide rods extending adjacent the end 708 of a chain conveyor system leading from a die cutter mechanism (not shown).

Also attached to the uprights 702 is a plate 710 atop which the sheet 82 is adapted to slide, said sheet having the partially severed cups C still at least partly integral therewith. The sheet 82 traverses the plate 710 until it arrives at a position resulting from the feed of the chain conveyor mechanism.

On top of the upright 702 are a pair of racks 712 and 714. In these racks are accommodated rollers 716 and 718 which roll back and forth in the racks and in turn support a plate 720 which is conveyed back and forth in the direction indicated by the arrow 722 in FIG. 3.

On top of said plate 720 are a plurality of towers 724 arranged in two sets. The towers 724 are aligned in rows and are spaced at distances corresponding to the arrangement of cups C formed in the plastic sheet 82. It is to be noted that the plate 720 and attendant rollers are replaceable by other such arrangements in which other towers are arranged to accommodate other articles of manufacture which can be produced in plastic sheets or the like.

In the plate 710, which is positioned below the plate 720 and parallel thereto, are provided a plurality of holes 726 which are also aligned in rows corresponding to the positions of cups C. Beneath plate 720 is an ejector mechanism 728, the function of which is to engage within the cups C, force them out of the sheet 82 and upwardly into the towers 724 wherein the cups are retained. Said ejector mechanism more particularly comprises a cylinder 730 relative to which is reciprocated a piston rod 732 which bears a plate or support 734.

On top of the plate 734 are arranged a plurality of rods 736 aligned with the holes 726 and on top of the rods 736 are arranged frustoconical mandrels 738 adapted to be extended through the holes 726 and into the cups C to remove the latter from the sheet 82.

The cylinder 730 receives its pressure fluid and expels the same via pipes 740 and 742. The admission or evacuation of such pressure fluid is controlled, for example, by means of switches 744 and 746, the latter of which is engaged by an angle 748 when the plate 734 is in uppermost position, switch 744 being engaged directly by the plate 734 when the latter is in its lowermost position.

In addition, there is mounted on a support 750 a further switch 752 constituting a counter of construction known per se which counts the number of strokes of rod 732 due to the corresponding engagement of angle 748. This enables the machine to know how many cups have been displaced upwardly into the towers 724.

Said towers each consist of hollow tubular members 754 shown in section in FIGS. 7–9 which may, for example, be detached from the plate 720 when the towers have been filled. Other alternative arrangements are possible to permit the removal of the stacked cups and, for example, tubular members 754 may be made integral with plate 720, the stacked cups being forced from the tubular members with a rod or the like when the towers have been filled.

FIG. 7 shows a mandrel 738 atop a rod 736, the mandrel 738 having previously engaged within a cup C and having displaced the same from the associated sheet 82. The cup moves upwardly in the direction indicated by the arrow 756 and is thrust into the corresponding tubular member 754.

Within each tubular member 754 are arranged a plurality of spring clips 758, these being preferably equidistantly distributed on the interior of the corresponding tower 754 at the lower end thereof. Such spring clips 758 will deflect as illustrated in FIG. 8 to permit the passage of the cups C, but upon withdrawal of the mandrel 738 will resume their normal positions of full extension whereupon the cups C will be retained in the tubular member 754. Accordingly, a form of mechanical rectification is provided in that the cups C can be inserted upwardly into tubular members 754 while being held therein against forces of gravity and/or withdrawal of the associated mandrel 738.

Mounted on horizontal element 714 is a cylinder 760 to which a pressure fluid is fed and exhausted via conduits 762 and 764. Cylinder 760 is effective to reciprocate a rod 766 connected via bracket 768 to plate 720.

Through the use of cylinders 760, plate 720 may be reciprocated back and forth in the direction indicated by arrow 722. More particularly, plate 720 is first transferred from the position illustrated in FIG. 3 to the right and thus back again by means of which first one section of the plate 720 and then a second section thereof is superposed above mandrels 738. This enables one section of towers to be filled whereafter that section is moved to the right and a section of empty towers brought into position for being filled. The reciprocation of the plate 720 and therefore the sections of towers is controlled by the counter switch 752 previously described which after a predetermined number of cups have been displaced into towers 724 causes fluid to be transmitted to cylinder 760 in such a manner as to effect the aforenoted displacing of the plate 720.

Also mounted on uprights 792 is a cylinder 770 which reciprocates rod 772 and frame 774 mounted on said rod. Spanning the support 774 is an electrically heatable resistance wire 776 which through the circuit previously described is effective to sever from the sheet 82 waste portions 82' from which the cups C have been previously removed.

Further mounted on frame 700 is a control box 778 by means of which automatic or manual operation of the up-stacking mechanism can be effected.

It will be understood that the up-stacking mechanism is aligned with other elements of the overall apparatus preferably in the manner diagrammatically illustrated in FIGS. 1 and 2.

There will now be obvious to those skilled in the art many modifications and variations of the structures set forth above. These modifications and variations will not depart from the scope of the invention if defined by the following claims.

What is claimed is:

1. A stacking mechanism adapted to operate on a sheet having therein three-dimensional objects opening downwardly, said three-dimensional objects being aligned in determinable order, said mechanism comprising a plurality of towers arranged in first and second sections, the towers on each section corresponding to the arrangement of the three-dimensional objects, means to superpose one of the sections of towers above the three-dimensional objects, a plurality of mandrels arranged below the towers in correspondence with the arrangement of the three-dimensional objects in said sheet, and means to displace said mandrels to remove said three-dimensional objects and insert the same in the superposed towers, said towers including inwardly directed spring-like means to admit said three-dimensional objects into said towers and to retain the same therein.

2. A stacking mechanism comprising a frame, means on said frame to receive a plastic sheet having three-dimensional objects formed therein and opening downwardly, said three-dimensional objects being aligned in determinable order, guide means in spaced and opposed relationship at the top of said frame, support means displaceable in horizontal direction in said guide means, a plate supported by said support means and displaceable therewith, a plurality of towers supported on said plate and arranged in first and second sections, the towers in each section corresponding to the arrangement of the three-dimensional objects, a cylinder mounted on said frame, a piston rod displaceable in said cylinder and connected to said plate and adapted to displace the latter to superpose one of the sections of towers above the three-dimensional objects, a further cylinder mounted on said frame below said plate, a piston rod displaceable in said further cylinder, and a support mounted on the latter said piston rod, a plurality of rods mounted on said support in correspondence with the arrangement of the three-dimensional objects in said sheet, mandrels on said rods and adapted to be inserted into said three-dimensional objects and to raise the latter from said sheet and insert the same in said towers.

3. A stacking mechanism comprising frame means to receive a plastic sheet having three-dimensional objects formed therein and opening downwardly, said three-dimensional objects being aligned in determinable order, channel means in spaced and opposed relationship at the top of said frame means, support means displaceable in horizontal direction in said channel means, a plate supported by said support means and displaceable therewith, a plurality of towers supported on said plate and arranged in first and second sections, the towers in each section corresponding to the arrangement of the three-dimensional objects, a cylinder mounted on said frame means, a piston rod displaceable in said cylinder and connected to said plate and adapted to displace the latter to superpose one of the sections of towers above the three-dimensional objects, a further cylinder mounted on said frame means below said plate, a piston rod displaceable in said further cylinder, a support mounted on the latter said piston rod, a plurality of rods mounted on said support in correspondence with the arrangement of the three-dimensional objects in said sheet, mandrels on said rods and adapted to be inserted into said three-dimensional objects and to raise the latter from said sheet and insert the same in said towers, switch means on said frame and adapted to be actuated by said support according to the position thereof, said switch means being adapted to control the transmission of pressure fluid to the latter said cylinder, and counting means on said frame adapted to count the number of three-dimensional objects displaced from said sheet and adapted to control the transmission of pressure fluid to the first said cylinder to control the reciprocation of said plate, said towers including inwardly directed spring-like properties to admit said three-dimensional objects into said towers and to retain the same therein.

4. A stacking mechanism comprising a frame, means on said frame to receive a plastic sheet having three-dimensional objects formed therein and opening downwardly, said three-dimensional objects being aligned in determinable order, channel means in spaced and opposed relationship at the top of said frame, support means displaceable in horizontal direction in said channel means, a plate supported by said support means and displaceable therewith, a plurality of towers supported on said plate and arranged in first and second sections, towers in each section corresponding to the arrangement of the three-dimensional objects, a cylinder mounted on said frame, a piston rod displaceable in said cylinder and connected to said plate and adapted to displace the latter to superpose one of the sections of towers above the three-dimensional objects, a further cylinder mounted on said frame below said plate, a piston rod displaceable in said further cylinder, a support mounted on the latter said piston rod, a plurality of rods mounted on said support in correspondence with the arrangement of the three-dimensional objects in said sheet, mandrels on said rods and adapted to be inserted into said three-dimensional objects and to raise the latter from said sheet and insert the same in said towers, switch means on said frame and adapted to be actuated by said support according to the position thereof, said switch means being adapted to control the transmission of pressure fluid to the latter said cylinder, counting means on said frame adapted to count the number of three-dimensional objects displaced from said sheet and adapted to control the transmission of pressure fluid to the first said cylinder to control the reciprocation of said plate, wire means extending transversely of the path of said sheet and adapted for being heated to sever waste from the sheet, cylinder means coupled to said wire to raise and lower the same to bring the wire into engagement with said sheet, and a control panel coupled to at least one of said cylinders to operate the same, said towers including inwardly directed spring-like projections to admit said three-dimensional objects into said towers and to retain the same therein.

5. A stacking mechanism comprising means to receive a plastic sheet having downwardly opening three-dimensional objects, said three dimensional objects being aligned in determinable arrangement, support means displaceable transversely of said means, a plate supported by said support means and displaceable therewith, a plurality of towers supported on said plate and arranged in first and second sections, the towers in each section corresponding to the arrangement of the three-dimensional objects, a cylinder, a piston rod displaceable in said cylinder and connected to said plate and adapted to displace the latter to superpose one of the sections of towers above the three-dimensional objects, a further cylinder mounted below said plate, a piston rod displaceable in said further cylinder, a support mounted on the latter said piston rod, a plurality of rods mounted on said support in correspondence with the arrangement of the three-dimensional objects in said sheet, mandrels on said rods and adapted to be inserted into said three-dimensional objects and to raise the latter from said sheet and insert the same in said towers, switch means on said frame and adapted to be actuated by said support according to the position thereof, said switch means being adapted to control the transmission of pressure fluid to the latter said cylinder, and counting means on said frame adapted to count the number of three-dimensional objects displaceable from said sheet and adapted to control the transmission of pressure fluid to the first said cylinder to control the reciprocation of said plate, said towers including inwardly directed spring-like means to admit said three-dimensional objects into said towers and to retain the same therein.

6. A stacking apparatus adapted to operate on a sheet having three-dimensional objects formed therein, said three-dimensional objects being aligned in determinable order, said apparatus comprising channel means, means to guide the sheet below said channel means, support means displaceable in horizontal direction in said channel means, a plate supported by said support means and displaceable therewith, a plurality of towers supported on said plate and corresponding to the arrangement of the three-dimensional objects, means connected to said plate to displace the latter to superpose the towers above the three-dimensional objects, a plurality of rods arranged below said towers in correspondance with the arrangement of the three-dimensional objects in said sheet, mandrels on said rods, and means to raise said rods so that the mandrels are inserted into said three-dimensional objects to raise the latter from said sheet and insert the same into said towers, said towers including inwardly directed means to admit said three-dimensional objects into said towers and to retain the same therein.

7. Apparatus as claimed in claim 6, wherein the mandrels are frustoconical.

8. Apparatus as claimed in claim 6, wherein the towers are tubular elements.

9. Apparatus as claimed in claim 6, wherein the inwardly directed means are U-shaped elements.

10. Apparatus as claimed in claim 6, wherein the U-shaped elements are equidistantly spaced around the inside of the tubular elements adjacent the bottom of the latter.

11. Apparatus as claimed in claim 6 comprising chain conveyor means to feed the sheet beneath said towers.

12. Apparatus as claimed in claim 11 comprising guide rods to guide the three-dimensional objects beneath said towers.

References Cited

UNITED STATES PATENTS

| | | |
|---|---|---|
| 2,034,269 | 3/1936 | Price. |
| 2,564,354 | 8/1951 | Conner _____ 83—103 |
| 3,015,303 | 1/1962 | Stohlquist _____ 214—6.2 X |
| 3,105,270 | 10/1963 | Fibish _____ 18—19 |
| 3,193,881 | 7/1965 | Kostur _____ 18—19 |
| 3,228,066 | 1/1966 | Rippstein _____ 18—19 |

M. HENSON WOOD, JR., *Primary Examiner.*

J. N. ERLICH, *Assistant Examiner.*